INVENTORS.
AUSTIN E. PETTYJOHN
ANTHONY F. KARLIN
BY Bosworth, Sessions, Herington
& Knowles
ATTORNEYS.

Jan. 31, 1967   A. E. PETTYJOHN ETAL   3,301,272
QUICK CONNECT COUPLING

Filed July 19, 1963   3 Sheets-Sheet 3

INVENTORS.
AUSTIN E. PETTYJOHN
BY ANTHONY F. KARLIN
Bosworth, Sessions,
Herschman & Knowles
ATTORNEYS.

United States Patent Office 3,301,272
Patented Jan. 31, 1967

3,301,272
QUICK CONNECT COUPLING
Austin E. Pettyjohn, Wickliffe, and Anthony F. Karlin, Northfield, Ohio, assignors to Lear Siegler, Inc., Los Angeles, Calif., a corporation of Delaware
Filed July 19, 1963, Ser. No. 296,217
6 Claims. (Cl. 137—614.06)

This invention relates to quick connect couplings and, in particular, to such couplings having self-sealing valving members in both coupling parts which can be opened and closed against pressure when the two coupling parts are locked together by manually operable means.

Such couplings find utility in a wide variety of hydraulic system applications in which it is desired to uncouple hydraulic lines under pressure without using separate valves in the hydraulic lines. Such couplings may be used, for example, in connecting the hydraulic pressure system of a tractor to the hydraulically operated accessories or implements hitched to and pulled by the tractor.

A general object of our invention is to provide a two-part valved coupling which may be connected and disconnected while the fluid passage through the coupling is closed and in which the valve or valves may be opened manually against substantial system pressures in either or both of the lines to which the coupling parts are connected when the two parts are locked together. Another object of our invention is to provide such a coupling having manually operable means which act to lock together and subsequently open the valve or valves in the coupling when moved in one direction and which act to close the coupling valves and subsequently unlock and release the connected coupling parts when moved in the other direction. Another object is to provide such a coupling in which the manually operable means is carried on one of the coupling parts and is effective to open valves of either or both of the parts and only when the two coupling parts are connected and locked together. A further object is to provide such a coupling which can be disconnected under full line pressure conditions when a specified pull force tending to separate the two coupling parts is applied to them. Another object is to provide a coupling which may be connected and disconnected under full line pressure without any appreciable loss of fluid from either or both of the lines. Yet another object of our invention is to provide a valved quick connect coupling which can be opened to fluid flow when in the locked-together condition and against substantial system pressures by moderate manually applied force.

These and other objects and advantages will be apparent from the following description of a preferred embodiment of our invention together with the accompanying drawings in which.

Figure 1:
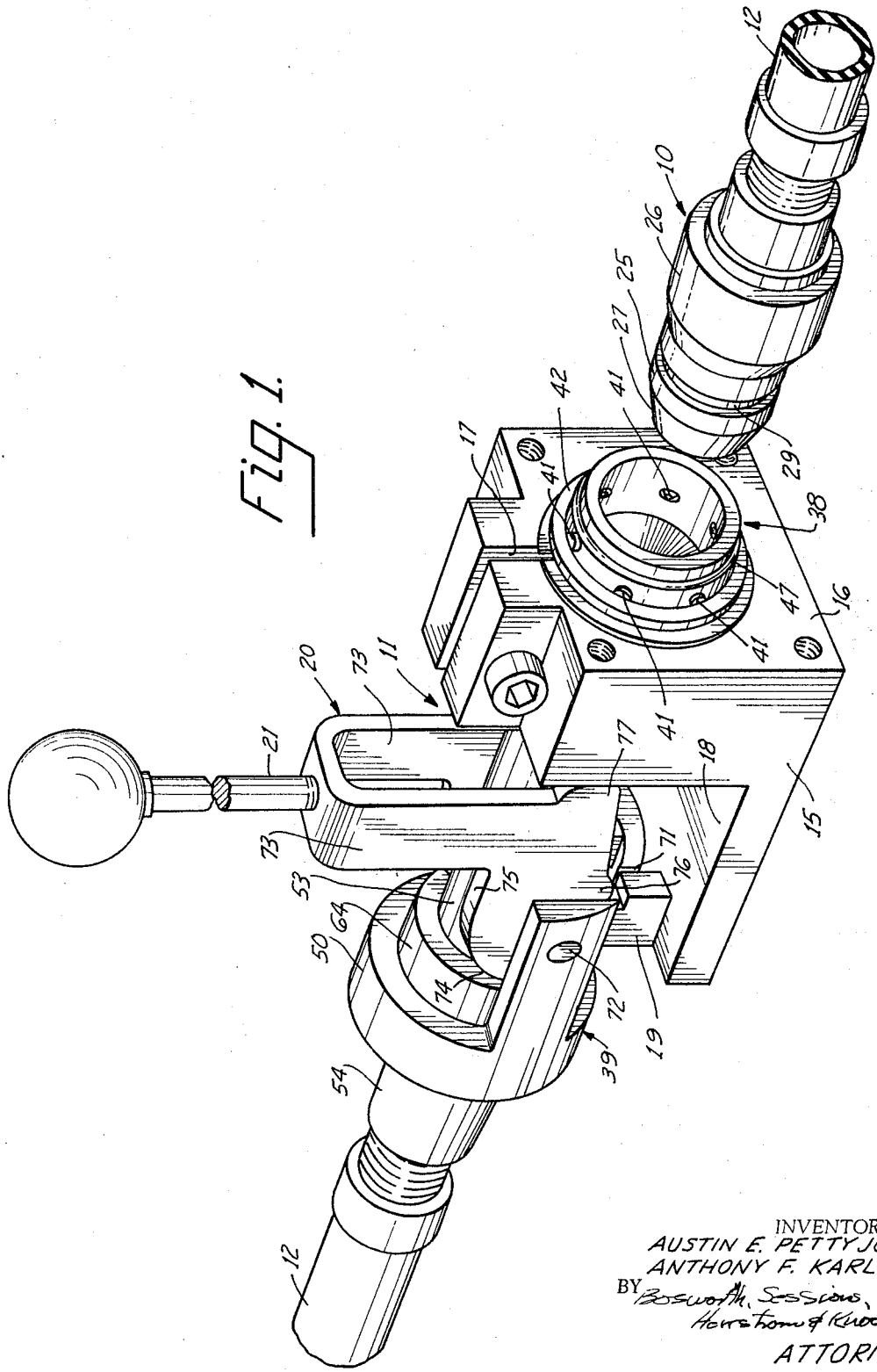
FIGURE 1 is a perspective view of the two coupling parts separated but aligned for connection and a socket mount for use with the coupling.

Referring now to the drawings, the coupling is made up of a nipple part indicated generally at 10 and a socket part indicated generally at 11. The forward end of socket part 11 is adapted to telescopingly receive the forward end or nose of nipple 10. The other ends of each of the parts are arranged to receive and connect to a hydraulic line or hose 12. In order to accomplish the full desired manual operation of which the coupling is capable, socket part 11 is held about its forward socket collar 42 by a mount 15 which is intended to be attached to a fixed structure. As shown in FIGURE 1, the mount has a forward wall 16 provided with a split opening 17 for receiving and gripping socket collar 42. A rearwardly extending wall 18 provides convenient means for attaching mount 15 to a fixed structure and carries as well a pair of backstops 19 which cooperate with the manual operating means indicated generally at 20 and mounted on socket 11 as described below.

Figure 2:
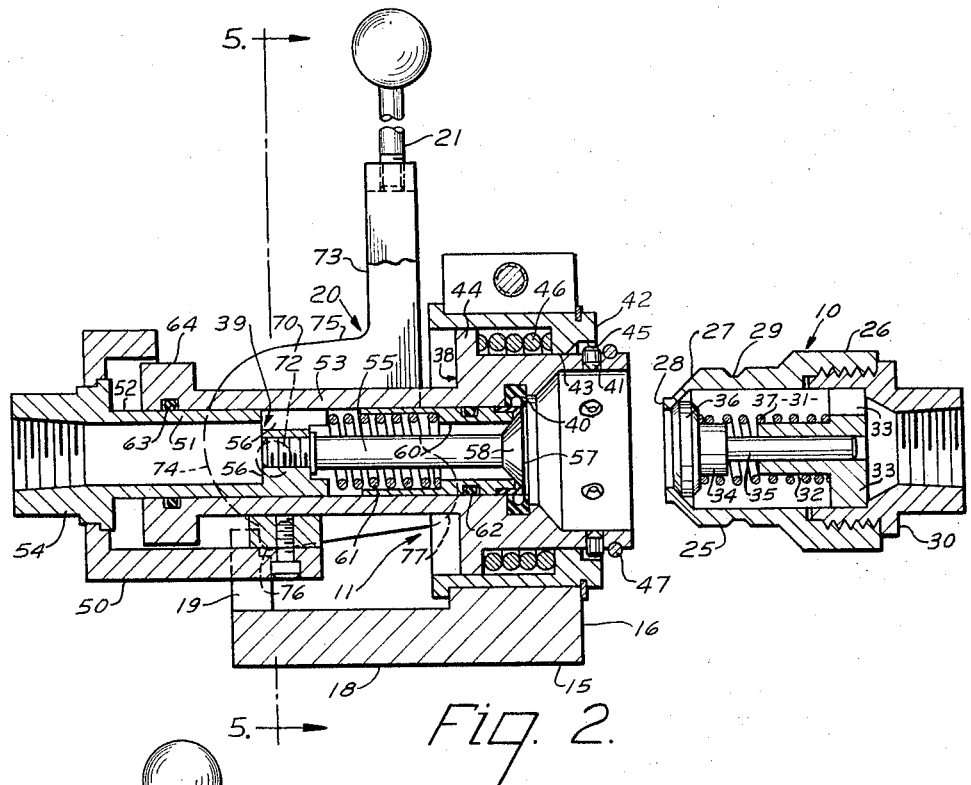
FIGURE 2 is an axial cross section of the two coupling parts in an uncoupled condition and with the valve in each of the parts closed and the socket part in its nipple-receiving condition.
Figure 3:
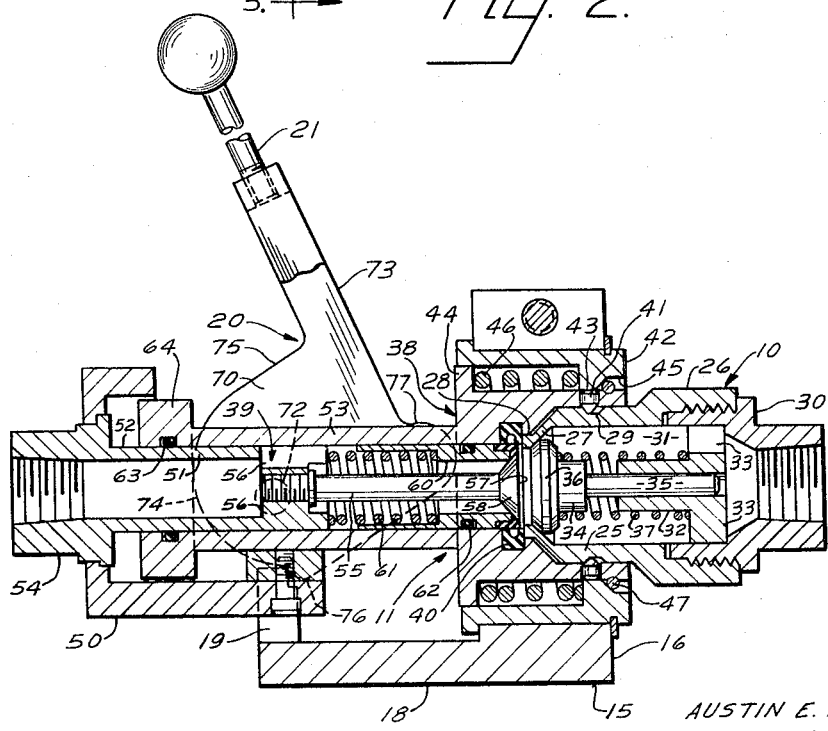
FIGURE 3 is an axial cross section of the coupling in a coupled condition with the valve in each of the parts closed.
Figure 4:
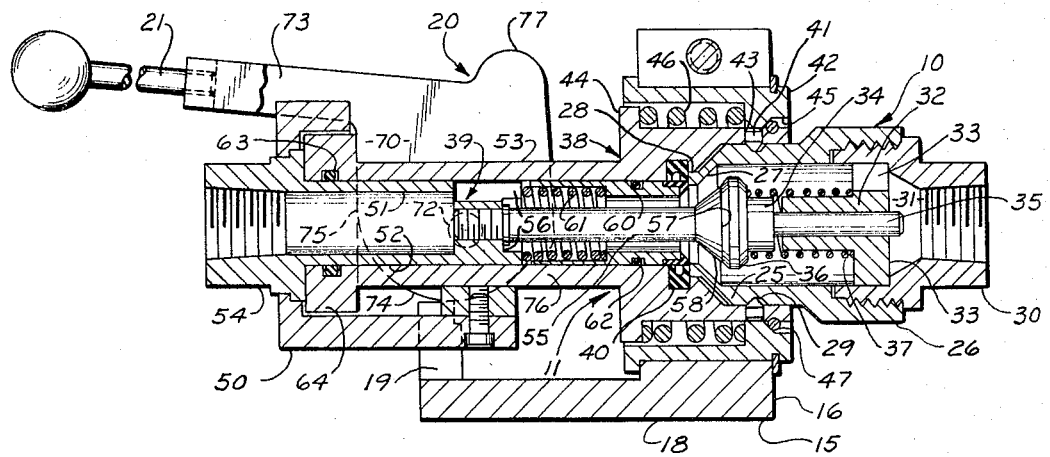
FIGURE 4 is an axial cross section of the coupling in a coupled condition with the valve in each of the coupling parts open.

The general operation of the coupling in terms of its foregoing description consists of connecting the two coupling parts by inserting the forward end of nipple 10 into the forward end of socket 11 with the operating handle 21 of manual operating means 20 in a forward position as shown in FIGURES 1 and 2. Thereafter, operating handle 21 is moved rearwardly to a first position as shown in FIGURE 3, locking nipple 10 within socket 11 and then rearwardly further to a second position as shown in FIGURE 4 which opens a valve in each of the coupling parts against the pressures contained in either or both of them and establishes fluid flow through the coupling. Movement of operating handle 21 in the opposite direction or forwardly acts first to permit a valve in each of the coupling parts to close against system pressures and then to release the locking means holding the two coupling parts together. As will be explained fully below, the two coupling parts, when connected together with their valves opened or closed, may also be automatically separated without the use of operating handle 21 and without any appreciable loss of hydraulic fluid by the specified separating pull as, for example, a good jerk on hydraulic line 12 connected to nipple 10.

Sets of identical couplings may be mounted in a gang arrangement in a suitably arranged mount and operated together by a single operating handle when it is desired to simultaneously and similarly operate more than one coupling. For example, couplings embodying our invention are useful on tractors for connecting the hydraulic pressure system of the tractor and a hydraulically actuated implement such as a baler hitched to the tractor. In this case, a pair of socket parts and a mount holding them are attached to a rear portion of the tractor and connected to the pressure and return lines of the tractor hydraulic system. A single operating lever is provided within easy reach of the tractor operator. A pair of nipples are connected to the pressure and return hoses of the baling implement for connection of its hydraulic system to the tractor system.

Nipple part 10, shown in side elevation in FIGURE 2 and in full axial cross section in FIGURES 3 and 4 is of generally cylindrical form having a nose portion 25 extending forwardly from an internally threaded barrel 26 at its rearward end. The forward end of nose portion 25 is beveled to provide a conical wall 27 terminating in an annular axial flange 28. An annular lock pin-receiving groove 29 is provided around the outside of nose portion 25 between conical surface 27 and barrel 26. Groove 29 is formed with two inclined side walls and a bottom wall for cooperation with the locking means carried in the socket part 22 as will be described below. An end adaptor 30 is turned into the internal threads of barrel 26 for receiving and connecting the nipple part to a hydraulic hose in a conventional manner.

As seen in the axial cross sections of FIGURES 3 and 4, nipple 10 has an internal passage 31 extending axially through it from the rear end of end adaptor 30 to and through the forward end of nose portion 25. A sleeve 32 is fixedly positioned in and coaxially of passage 31 by radially extending arms 33 attached to the inner wall of end adaptor 30. A sliding poppet valve 34 having a rearwardly extending stem 35 slidably mounted in fixed sleeve 32 and an enlarged valve closure head 36 at its forward end shaped to sealingly engage the inner surface of conical forward wall 27 of nose 25 is provided to seal against fluid pressure supplied to nipple 10 through end adaptor 30. It will be apparent that fluid pressure acts to urge valve closure 36 into sealing engagement. In addition, a helical spring 37 acting between radial arms 33 and the rear side of valve closure head 36 tends to urge poppet valve 34 closed.

Socket part 11, of generally cylindrical form, consists generally of a forward body portion indicated generally at 38 and a poppet valve portion indicated generally at 39 telescopingly received within forward body portion 38. Forward body portion 38 has an open forward end shaped to telescopingly receive nose portion 25 of nipple 10 and contains a fluid seal 40 for engagement with annular flange 28 of the nipple and locking means arranged to cooperate with annular lock pin-receiving groove 29 of the nipple.

The locking means carried by body portion 38 of the socket consists of a number of radial acting locking pins or elements 41 mounted for axial motion in a radial direction in a corresponding number of circumferentially spaced and radially directed openings in the wall of the nipple-receiving part of body portion 38. Locking pins 41, as shown, are generally cylindrical and have conical inner ends adapted to cooperate with the shape of groove 29 in the nipple and slightly spherical outer ends.

A locking collar 42 is mounted for axial sliding motion on the exterior of the nipple-receiving part of body portion 38 of the socket. Collar 42 has an internal annular radial flange 43 slidably engaging the outer surface of body portion 38 in the region of lock pins 41. An external annular radial flange 44 located rearwardly of lock pins 41 on body part 38 slidably engages the inside surface of collar 42. Forward of internal annular flange 43 of the locking collar is an internally relieved portion 45 of larger diameter than the inside diameter of flange 43. A helical spring 46, acting between flange 44 of body part 38 and flange 43 of locking collar 42, tends to urge locking collar 42 forwardly relative to body portion 38 of the socket to the position shown in FIGURES 3 and 4. It will be noted that in this position, internal flange 43 of the locking collar overlies the outer ends of lock pins 41 so that they are locked into a position projecting into the socket part of the body portion 38 and into engagement with annular groove 29 of the nipple. When locking collar 42 is retracted against spring 46 to the position as shown in FIGURE 2, lock pins 41 are free to be cammed radially outward and out of engagement with groove 29 of the nipple. A snap ring 47, mounted externally of body part 38 and forwardly of lock pins 41 carried therein, prevents locking collar 42 from sliding forwardly off body part 38.

From the above description of the forward body portion 38 of the socket, it will be apparent that the nipple can be connected and locked in fluid-tight engagement in the socket by axially sliding motion of locking collar 42 coacting with lock pins or elements 41.

Poppet valve portion 39 of the socket consists of an outer barrel 50. Extending concentrically with and through barrel 50 and fixedly attached to it at its rearward end is an inner barrel 51 having a cylindrical outer surface 52 mounted for axial sliding motion within the rearwardly extending tubular portion 53 of forward body portion 38. The rearward end 54 of inner barrel 51 is internally threaded and adapted to receive a conventional hydraulic hose coupling.

A central valve stem 55 is fixedly mounted coaxially of the socket by inwardly extending radial arms 56 in the forward end of inner barrel 51 and projects forwardly therefrom to a point generally opposite annular fluid seal 40 where it terminates in an enlarged conical valve closure head 57.

A valve seat sleeve 60 is mounted for axial motion within forward body portion 38 rearwardly of fluid seal 40 and surrounds central valve stem 55 and closure head 57. The forward end of sleeve valve 60 is designed to have sealing engagement with the rearwardly facing conical surface 58 of valve closure head 57 and is urged into sealing engagement therewith by helical spring 61 acting between an internal radial shoulder on sleeve valve 60 and the forward end face of inner barrel 51.

An annular seal 62 is carried in an appropriate external groove of sleeve valve 60 for sealing engagement with the inside surface of tube 53 of body portion 38. A similar internal annular seal 63 is carried in an appropriate groove in the rearward end of tube 53 of body portion 38 for sealing engagement with the outer cylindrical surface 52 of inner barrel 51. The rearward end of tube 53 is also provided with an external annular radial flange 64 whose outside diameter slides within and is guided by the inner cylindrical surface of outer barrel 50 of the poppet valve portion 39 of the socket.

Fluid flows through socket 11 as described above along a path entering through the rearward end 54 of inner barrel 51 and between radial arms 56 near its forward end, along the outer surface of central valve stem 55 and inside sleeve valve 60 and thence out the forward end of the socket between the forward end of sleeve valve 60 and valve closure 57 when the sleeve valve and valve seat are out of engagement.

Figure 5:
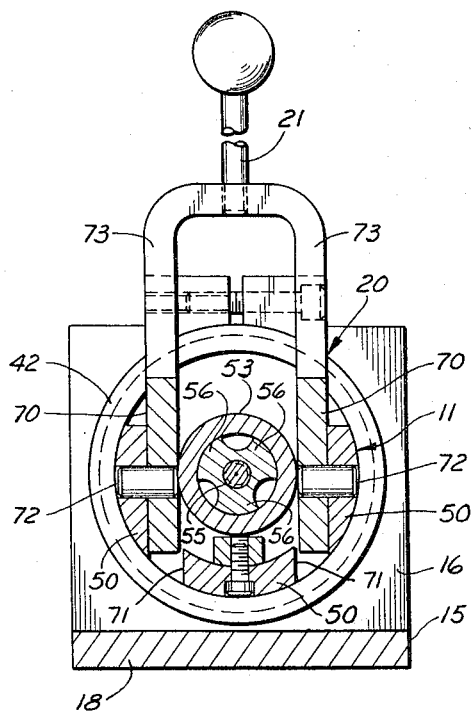
FIGURE 5 is a radial cross section taken in the plane of line 5—5 of FIGURE 2.

Manual operating means 20 preferably consists of a pair of cam plates 70 mounted on opposite sides of outer barrel 50 of poppet valve portion 49. Cam plates 70 operate and are mounted in axially extending chordal slots 71 in the forward portion of outer barrel 50 and which lie in planes parallel to each other and the axis of the coupling. Cam plates 70 are mounted for rotational movement about a common axis perpendicular to the axis of the coupling by pins 72 carried in outer barrel 50. See FIGURE 5. An operating handle 21 is preferably attached to the joined-together projecting arms 73 of cam plates 70 for use in imparting rotational movement to cam plates 70. The outlines of cam plates 70 are formed generally in a spiral 74 on their rearward sides, merging into a preferably straight-line portion 75 adjacent projecting arms 73. A first radial protrusion or bump 76 is provided on the lower side of each cam plate 70 generally below pivot pin 72 as the coupling is shown in the drawings. A second radial protrusion or bump 77 is formed on the forward side of each of cam plates 70.

Socket parts 11 is preferably mounted in a socket mount 15 which holds locking collar 42 of the socket and which has a rearwardly extending portion 18 carrying a pair of backstops 19 which extend radially into slots 71 in outer barrel 50. As described above, mount 15 is intended to be attached to a fixed structure. When carried in socket mount 15 as described above, locking collar 42 of the socket is held in a fixed position. Body portion 38 of the socket is free to move axially with respect to locking collar 42 and poppet valve portion 39 is free to move axially inside body portion 38.

The full sequence of operation of a coupling constituting a preferred embodiment of our invention is shown in FIGURES 2, 3 and 4. In FIGURE 2, the coupling is shown in a disconnected conditon with the poppet valves in each of the coupling parts closed. Socket part 11 is carried in mount 15 as described above and cam plates 70 are in their fully clockwise position with operating handle 21 in its corresponding full forward position. With cam plates 70 in the position shown in FIGURE 2, the first bump 76 on each of the plates engages the forward side of backstops 19 while the second bump 76 reaches inside locking collar 42 and into engagement with the back side of exterior annular flange 44 of body portion 38. The axial spacing between first and second bumps 76 and 77 and the axial spacing between the fixed position of locking collar 42 and backstops 19 in such that body portion 38 is moved axially forward compressing helical spring 46 acting between it and the locking collar. In this relative position of body portion 38 and locking collar 42, lock pins 41 are radially opposite the internal relieved portion 45 of the locking collar, permitting them to move radially outward when nose portion 25 of nipple 10 is inserted into the forward end of body portion 38.

The second step in the sequence of operation is shown in FIGURE 3. Nipple portion 10 is fully inserted in socket portion 11 and cam plates 70 are rotated counterclockwise from their fully clockwise position by movement of operating handle 21 to its corresponding first rearward position. The counterclockwise rotation of cam plates 70 reduces the axial spacing between the engaging portions of first and second bumps 76 and 77, permitting helical spring 46 to move body portion 38 rearwardly with respect to locking collar 42 so that its internal radial flange 43 overlies and locks lock pins 41 into an extended position of locking engagement in groove 29 of nipple 10. As shown in FIGURE 3, the two coupling parts are connected and locked together and the poppet valves in each of the parts remain closed and sealed. Axial annular flange 28 on the forward end of nipple 10 is in sealing engagement with fluid seal 40 of the socket. It will be apparent that coupling and locking of the two coupling parts is accomplished without the loss of fluid even though the lines attached to the two coupling parts may be under substantial hydraulic pressure. It will also be noted that a lesser radius portion of spiral outline 74 of each of cam plates 70 approaches and/or lightly engages the forward side of external radial flange 64 on the rearward end of tube 53 of body part 38.

The third step in the sequence of operation is shown in FIGURE 4. The nipple and socket parts remain coupled and locked together with a fluid seal established between them. Cam plates 70 are rotated to their fully counterclockwise positon by movement of operating handle 21 to its corresponding second and full rearward position. Movement of cam plates 70 from their position as shown in FIGURE 3 to their position shown in FIGURE 4 brings successive portions of increasing radius of spiral outline 74 to bear and act upon annular flange 64 of body portion 38. It will therefore be apparent that as cam plates 70 are moved counterclockwise from their FIGURE 3 position, the axial spacing between the axis of rotation of cam plates 70 and the forward side of external radial flange 64 will increase. Because the axis of rotation of cam plates 70 is fixed with respect to outer barrel 50 of poppet valve portion 39 of the socket and, therefore, with respect to all poppet valve portion 39, including valve closure head 57, poppet valve portion 39 will be moved forward with respect to body portion 38. Forward movement of poppet valve portion 39 moves valve closure head 57 into and through the forward opening in nipple 10 and into abutting engagement with the forward side of nipple valve closure 36. At the same time, helical spring 61 urges valve seat sleeve 60 forward and into abutting engagement with axial annular flange 28 of the nipple, limiting further forward movement of sleeve 60.

Further counterclockwise rotation of cam plates 70 to their position as shown in FIGURE 4 extends socket valve closure head 57 further into the nose of nipple 10 and out of engagement with sleeve 60. Such further forward extension moves nipple valve closure head 36 out of sealing engagement with its cooperating valve seat, fully opening the connected and locked coupling to fluid flow and/or fluid pressure communication between the hoses or lines connected to the two coupling parts. As shown in FIGURE 4, when cam plates 70 are in their full counterclockwise position, the straight portion 75 of their outline is in engagement with the flat annular face of flange 64, serving to releasably hold and maintain cam plates 70 in their full counterclockwise position and thereby the valving means of the coupling parts open.

We prefer the axis of rotation of cam plates 70 be radially offset a small amount below the axis of the coupling as shown in the drawings. This relationship of the two axes increases the holding power of cam plates 70 in their fully clockwise and counterclockwise positions.

The coupling may be closed to fluid flow and/or pressure communication and disconnected by the reverse sequence of operation to that set forth above. The clockwise rotation of cam plates 70 from their fully counterclockwise FIGURE 4 position acts first to permit helical spring 61 to withdraw socket valve closure head 57 from nipple 10 back into sealing engagement with sleeve 60. Nipple valve closure head 36 is returned to its position of sealing engagement by helical spring 37, thus fully closing the valves in both coupling parts while they remain connected and locked together.

It will be noted that because of the axial movement permitted sleeve 60, socket valve closure head 57 achieves sealing engagement with it while still in abutting engagement with nipple valve closure head 36 and substantially at the same time the nipple valve achieves sealing engagement. Also, both the nipple and socket valves open at substantially the same time with their respective valve closure heads in abutting engagement. Therefore, when the two coupling parts are connected and the valves therein opened, substantially no air is introduced into the system; and, when the valves in the two coupling parts are closed and the coupling parts disconnected breaking the fluid seal between them, substantially no fluid is lost from the system. Axially sliding sleeve 60 also acts to insure that the socket valve cannot be opened by operation of cam plates 70 when the nipple is not connected and locked to the socket because without the nipple in place to limit the forward motion of sleeve 60, the sleeve will follow socket valve closure head 57 to its fullest forward position of extension, maintaining sealing engagement therewith.

The coupling as described above and with the socket part carried in a mount includes an automatic disconnect feature whereby the two coupling parts, when connected and locked together with the valves open or closed, can be automatically unlocked and separated by a specified separating pull on the coupling parts. It will be apparent from both FIGURES 3 and 4 that when locking collar 42 is in its rearward position with respect to socket body 38 that nipple 10 is connected together with socket 11 by the projection of lock pins 41 into annular groove 29 of the nipple. Therefore, with locking collar 42 held in a mount, a separating pull on nipple 10 or the hose connected to it will pull the nipple and the socket part connected to it axially against the force of locking collar spring 46, bringing lock pins 41 radially opposite the internally relieved portion 45 of locking collar 42 so that they can be cammed outwardly by the inclined side wall of annular groove 29 in the nipple. The force of the pull required to automatically separate the socket and nipple is dependent upon the strength of locking collar spring 46. Upon separation, the valving means in both the socket and nipple parts will immediately be urged to their closed position by their respective poppet valve springs.

This automatic disconnect feature is useful, for example, when a coupling embodying our invention is used to interconnect the hydraulic system of a tractor and a hydraulically operated machine or implement hitched to it. In this case, the socket part is mounted on the tractor and the nipple part to a hose on the implement. In the event that the implement becomes unhitched or the implement hose becomes tangled or engaged by objects encountered during its operation, the coupling will automatically disconnect, preserving it and preventing the loss of hydraulic fluid and/or pressure in the interrupted hydraulic system.

It will be apparent that only the socket portion of the coupling shown and described need have a valving arrangement operable by operating means 20 while the nipple may be unvalved and always open when used in an appropriate hydraulic system. Further, the valve opening feature of the operating means 20 of the socket part may be utilized when the socket part is not carried in a mount as described above. The locking and unlocking feature of the manual operating means, however, requires the use of a socket mount holding the socket collar.

In connection with the locking and unlocking feature of our coupling, it will be understood that other releasable locking mechanisms than that shown and described herein may be employed with equal success so long as actuation of the locking means is accomplished by relative axial movement of a locking collar and cooperating locking elements in the socket body.

Couplings substantially similar to the preferred embodiment described above and shown in the drawings have been made which are capable of opening the valves against line pressures up to three thousand p.s.i. gauge by moderate manually applied forces on an operating handle connected to the cam plates.

Those skilled in the art will appreciate that various changes and modifications can be made in the preferred form of apparatus described herein without departing from the spirit and scope of the invention.

We claim:

1. In a coupling having telescoping nipple and socket parts with cooperating means for releasably locking them together, a socket part comprising
   a socket body for receiving said nipple part,
   a valve seat and
   a poppet valve in said socket body, said poppet valve being
      axially movable with respect to said socket body and
      into and out of sealing engagement with said valve seat,
   spring means tending to urge said poppet valve into sealing engagement with said valve seat,
   movable cam means mounted on one for engagement with the other of said socket body and said poppet valve for axially positioning one with respect to the other,
   whereby movement of said cam means in one direction permits said spring means to position said poppet valve in sealing engagement with said valve seat and movement of said cam means in the other direction axially moves said poppet away from said valve seat against the force of said spring means to a position out of sealing engagement with said valve seat,
   said socket body having an open forward nipple-receiving portion and a tubular portion extending rearwardly therefrom and
   said poppet valve having an inner barrel mounted for axial sliding engagement with and within said socket body tubular portion, said barrel having a rearward extension for connection to a hydraulic line and a forward stem extending through said valve seat and terminating in an enlarged valve closure head forwardly of said valve seat,
   said rearward tubular extension of said socket body portion having an external annular flange and
   said poppet valve having an outer barrel connected in concentric relationship with said inner barrel to said rearward extension thereof and overlying and extending forwardly of said external flange on said rearward tubular extension of said socket body and
   said cam means comprising a cam plate mounted on said outer barrel of said poppet valve forwardly of said external flange on said body portion for rotational movement in a plane parallel to the axis of said socket and for engagement of the peripheral edge of said cam plate and said external flange.

2. A coupling comprising telescoping nipple and socket parts having cooperating means for releasably locking them together, said socket part comprising
   a socket body having a forward open nipple-receiving end and a tubular portion extending rearwardly therefrom,
   a poppet valve in said socket body having a central stem extending forwardly and terminating in an enlarged valve closure head, said poppet valve being mounted within said socket body tubular portion and having sliding axial engagement therewith and therein between a rearward position with said valve closure head retracted rearwardly of said forward open nipple-receiving end of said socket body and a forward position with said valve closure head projected forwardly into said forward open nipple-receiving end of said socket body and into said nipple part when said telescoping nipple and socket parts are telescopingly engaged,
   a valve seat sleeve mounted for axial sliding motion with and within said socket body tubular portion and concentrically of said poppet valve and having a generally forwardly facing valve seat smaller in diameter than said enlarged valve closure head and adapted to have its forward sliding motion limited by sealing engagement with said head and adapted to have abutting engagement with said nipple when said socket and nipple parts are telescopingly engaged,
   spring means acting between said valve seat sleeve and said poppet valve tending to urge said valve seat sleeve and said valve seat toward and into sealing engagement with said valve closure head,
   movable cam means mounted on one for engagement with the other of said socket body and said poppet valve for coacting with said spring means to axially position one with respect to the other and to axially position said valve closure head forwardly of and out of sealing engagement with said valve seat when said nipple is telescopingly engaged in said socket part and in abutting engagement with said valve seat sleeve.

3. Apparatus according to claim 2 in which
   said rearward tubular extension of said socket body has an external annular flange and in which
   said poppet valve has an outer barrel connected to and in concentric relationship with its central stem, said outer barrel overlying and extending forwardly of said external flange on said rearward tubular extension of said socket body and in which
   said cam means comprises a cam plate mounted on said outer barrel of said poppet valve forwardly of said external flange on said body portion for rotational movement in a plane parallel to the axis of said socket and for engagement of the peripheral edge of said cam plate and said external flange.

4. The coupling according to claim 2 in which
   locking means comprises locking elements carried in said socket body and a locking collar for actuating them mounted exteriorly of said socket body for limited axial sliding motion relative thereto, said locking collar being movable relative to said socket body between a forward position of actuating cooperation with said locking elements for locking said socket and nipple parts together and a rearward actuating position for unlocking said socket and nipple parts, and together with
   a fixed socket mount for mounting said socket part by connection to said locking collar and having a backstop element,
   said cam means being concurrently engageable with said backstop element and said socket body and movable to axially position said locking collar in and between its rearward actuating and unlocking position with respect to said socket body and its forward position of cooperation with said locking elements, all independently of socket part poppet valve operation.

5. The coupling according to claim 4 in which said nipple part comprises
 a hollow body part having a forward nose projecting into said socket body and engaging said valve seat sleeve when said coupling parts are coupled together,
 a cooperating stationary valve seat and
 a movable poppet valve mounted concentrically of and within said nipple body for movement forwardly toward and into sealing engagement with its cooperating valve seat and rearwardly away from and out of sealing engagement with its cooperating valve seat and
 spring means urging said nipple poppet into sealing engagement with its cooperating valve seat,
 whereby when and after said coupling parts are coupled and locked together by operation of said cam means in one direction to move said locking collar to its forward locking position, further movement of said cam means in said one direction moves said socket poppet valve forward with respect to said socket body and out of spring-urged sealing engagement with said socket valve seat and into abutting engagement with said nipple poppet valve and moves said nipple poppet valve against said nipple spring means and out of sealing engagement with its cooperating valve seat opening the connected coupling to fluid flow therethrough and movement of said cam means in the opposite direction moves said socket poppet valve rearward with respect to said socket body and permits said nipple spring means to move said nipple poppet valve into sealing engagement with its cooperating valve seat and brings said socket poppet into engagement with said socket valve seat closing the connected coupling to fluid flow therethrough.

6. A coupling comprising telescoping valved nipple and socket parts having cooperating means for releasably locking them together, movable cam means for operating said locking means and said nipple and socket valves and a mount for said socket part,
 said socket part comprising
  a socket body having a forward open nipple-receiving end and a rearwardly extending tubular portion having an external annular flange,
  a poppet valve in said socket body having an inner and outer barrel connected in concentric relationship at their rearward ends, said inner barrel being mounted for axial sliding engagement with and within said socket body tubular portion and having a concentric central stem extending forwardly and terminating in an enlarged valve closure head and movable with said inner barrel between a rearward position with said valve closure head retracted rearwardly of said forward open nipple-receiving end of said socket body and a forward position with said valve closure head projected forwardly into said forward nipple part when said telescoping nipple and socket parts are telescopingly engaged, said outer barrel overlying and extending forwardly of said external annular flange on said rearward tubular socket body extension and having relative axial motion therewith corresponding to the relative position of axial sliding engagement between said inner barrel and said rearward tubular socket body extension,
  a valve seat sleeve mounted for axial sliding motion with and within said socket body tubular portion and concentrically of said poppet valve and having a generally forwardly facing valve seat smaller in diameter than said enlarged valve closure head and adapted to have its forward sliding motion limited by sealing engagement with said head and adapted to have abutting engagement with said nipple when said socket and nipple parts are telescopingly engaged,
  spring means acting between the forward end of said inner barrel and the rearward end of said valve seat sleeve and tending to urge said valve closure head and said valve seat together in sealing engagement,
 said nipple part comprising
  a hollow body part having a forward nose projecting into said socket body and engaging said valve seat sleeve when said coupling parts are coupled together,
  a cooperating stationary valve seat and a movable poppet valve mounted concentrically of and within said nipple body for movement forwardly toward and into sealing engagement with its cooperating valve seat and rearwardly away from and out of sealing engagement with its cooperating valve seat, said nipple poppet valve having abutting engagement with and being movable by said socket poppet valve and
  spring means urging said nipple poppet into sealing engagement with its cooperating valve seat,
 said locking means comprising locking elements and a locking collar for actuating them mounted for limited axial sliding motion exteriorly of and with respect to said socket body and movable relative to said socket body between a forward actuating position for locking said socket and nipple parts together and a rearwardly actuating position for unlocking said socket and nipple parts,
 said socket mount comprising a backstop element and means for holding said socket by engagement with said socket collar while permitting relative axial motion between said socket and said socket body,
 said movable cam means comprising
  a cam plate mounted on said outer barrel of said socket poppet valve forwardly of said external flange on said body portion for rotational movement in a plane parallel to the axis of said socket and having a portion of peripheral outline for concurrently engaging in a central position of rotation said backstop element and said socket body and movable forwardly away and rearwardly toward said central position to axially position said locking collar in its rearward actuating and unlocking position and its forward actuating and locking position with respect to said socket body respectively,
  said cam plate having another portion of peripheral outline for engaging said rearward external flange of said tubular body portion and for successively increasing the axial spacing between the axis of rotation of said cam plate and said external flange when rotated rearwardly from said central position and for decreasing the axial spacing between the axis of rotation of said cam plate and said external flange when said cam plate is rotated forwardly toward said central position whereby rotational movement of said cam forwardly of its central position serves to connect and disconnect said coupling parts and rotational motion rearwardly of said central position serves to open and close said poppet valves of said coupling parts.

References Cited by the Examiner

UNITED STATES PATENTS

| 453,012 | 5/1891 | Lonergan | 251—340 |
|---|---|---|---|
| 3,113,588 | 12/1963 | Torres | 137—614.06 |

FOREIGN PATENTS 227,729  4/1960  Australia.

M. CARY NELSON, *Primary Examiner.*
MARTIN P. SCHWADRON, *Examiner.*
R. J. MILLER, *Assistant Examiner.*